March 12, 1929.    E. A. SAURMAN    1,705,069
SHIFT LEVER HANDLE ILLUMINATING DEVICE
Filed Aug. 6, 1927
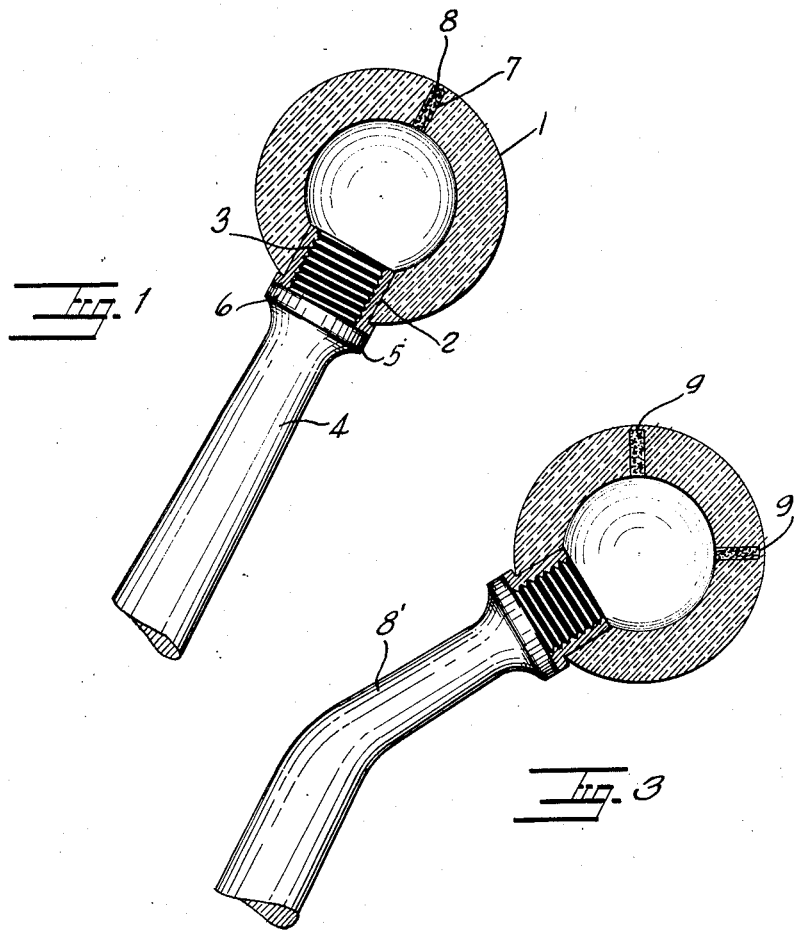
INVENTOR.
E. A. SAURMAN
BY
ATTORNEY Patented Mar. 12, 1929.

1,705,069

UNITED STATES PATENT OFFICE.

EDWARD A. SAURMAN, OF OAKLAND, CALIFORNIA.

SHIFT-LEVER HANDLE-ILLUMINATING DEVICE.

Application filed August 6, 1927. Serial No. 211,055.

My invention relates to illuminated handle for gear shift levers or the like.

An object of the invention is to provide an illuminated handle for gearshift levers, so that the exact location of said lever may be readily seen in the dark.

Another object of the invention is to provide an illuminated handle that is adaptable to any type of gearshift lever, and is simple and inexpensively constructed.

With the foregoing and other objects in view, my invention resides in the combination and the arrangement of parts and in the details of construction hereinafter described and claimed, it being understood that changes in the precise embodiment of the invention hereinafter disclosed may be made within the scope of the appended claims without departing from the spirit of the invention.

In the drawings:

Figure 1 is a sectional view of the device of my invention shown attached to a standard type of shift lever.

Figure 2 is a plan view of the device of my invention.

Figure 3 is a side sectional view of a secondary embodiment of my invention.

My invention is preferably designed for motor driven vehicles such as automobiles and is particularly adapted to provide an illuminated handle which is secured to the shift lever of said automobiles. Heretofore, gear shifting at night has been the cause of a great deal of annoyance and delay in that it is necessary to grope around to locate the gear shift handle due to its invisibility in the dark.

With the device of my invention the gearshift handle is so illuminated that the exact position of said handle is known at all times.

As shown in the accompanying drawings, I provide a gear shift handle member 1, said member is preferably in the form of a hollow sphere and is made of any transparent material, such as glass or the like. The gear shift handle member 1 is provided with a bore 2, said bore to form a passage between the outside periphery and the inside periphery of said handle member. A bushing 3 is fixedly secured in the bore 2. The inside diameter of said bushing 3 is threaded to engage corresponding threads formed on one end of a standard type of gear shift lever 4. The bushing 3 as shown in the drawings is provided with an annular flange 5 which is adapted to be screwed tightly against a corresponding flange 6 formed on the shift lever 4.

A pocket 7 is formed in the handle member 1 opposite the bore 2 and in alignment therewith. One end of said pocket communicates with the hollow portion of the handle member 1, and extends therefrom to the outside surface of the handle member 1, but does not extend therethrough. The chamber 7 is filled with any material 8 that will produce a glow in the dark such as a preparation of radium. The preparation that is placed in the chamber 7 should preferably be in the form of a powder or paste, sufficiently adhesive to remain in said chamber when the handle member is jolted or vibrated due to the motion of the vehicle.

Another form of the invention is shown in Figure 3. The invention as shown in Figure 3 is constructed similar to the form shown in Figures 1 and 2 except that this form is more particularly adapted to be attached to a shift lever 8', one end of which is bent so that it is more accessible to the operator. In this I provide a plurality of radial chambers 9, similar to the chamber 7 in Figure 1 and positioned so that one of said chambers will be visible regardless of the position of the shift lever 8. It will also be noted that not only is the device of a very practical and useful nature, but it also provides a very desirable ornament.

I claim:

1. A gear shift lever ball for motor vehicles comprising a bushing for removably engaging the handle of a gear shift lever, a translucent ball secured to said bushing, said ball being formed with an outer wall and a central spherical hollow portion, and having chambers extending radially from the hollow portion into the outer wall, an illuminating material mounted in each of said chambers, said illuminating material to cause the illumination of said entire ball.

2. A gear shift lever ball for motor vehicles comprising a translucent ball, said ball being provided with an outer wall and a central spherical hollow portion, and having chambers extending radially from the hollow portion into the outer wall, an illuminating material mounted in each of said chambers, said illuminating material to cause the illumination of said entire ball, and a bushing secured in an opening extending through said outer wall, the inside periphery of said bushing being threaded for engagement with corresponding threads on a gear shift lever.

In testimony whereof I affix my signature.

EDWARD A. SAURMAN.